(12) United States Patent
Johnson (10) Patent No.: US 7,210,637 B1
(45) Date of Patent: May 1, 2007

(54) SELECTIVELY CONFIGURABLE MISTING APPARATUS

(76) Inventor: James Johnson, 5580 Crossbill La., El Dorado, CA (US) 95623

( * ) Notice: Subject to any disclaimer, the term of this patent is extended or adjusted under 35 U.S.C. 154(b) by 163 days.

(21) Appl. No.: 10/889,591

(22) Filed: Jul. 12, 2004

(51) Int. Cl.
*A24F 25/00* (2006.01)
*A01G 25/02* (2006.01)
*B05B 15/06* (2006.01)

(52) U.S. Cl. .................. 239/34; 239/266; 239/267; 239/268; 239/273; 239/279; 239/280

(58) Field of Classification Search .................. 239/34, 239/266, 267, 268, 273, 279, 280, 282, 600, 239/390, 392
See application file for complete search history.

(56) References Cited

U.S. PATENT DOCUMENTS

| | | | |
|---|---|---|---|
| 3,185,397 A | * | 5/1965 | Nelson .................. 239/556 |
| 5,121,882 A | * | 6/1992 | Skidmore ............... 239/269 |
| 5,330,104 A | | 7/1994 | Marcus |
| 5,598,719 A | * | 2/1997 | Jones et al. ............... 62/304 |
| 5,613,371 A | | 3/1997 | Nelson |
| 5,628,273 A | | 5/1997 | Crose, II |
| 6,015,099 A | | 1/2000 | Ducey |
| 6,081,944 A | | 7/2000 | Edwards |
| 6,158,669 A | | 12/2000 | Louis |
| 6,161,362 A | * | 12/2000 | Forbis et al. ............ 52/745.06 |
| 6,175,969 B1 | | 1/2001 | Edwards |
| 6,263,826 B1 | | 7/2001 | Key |
| 6,315,219 B1 | | 11/2001 | Palestrant |
| 6,325,362 B1 | | 12/2001 | Massey et al. |

\* cited by examiner

*Primary Examiner*—Davis Hwu
(74) *Attorney, Agent, or Firm*—Michael I Kroll (57) ABSTRACT

An apparatus for dispersing mist in a predetermined area includes means for obtaining water from a water source and means for dispersing the water as mist. A connecting means connects the obtaining means to the dispersing means. Upon the obtaining means obtaining water, water is provided through the connecting means for dispersing by the dispersing means thereby providing a cooling mist therefrom.

3 Claims, 9 Drawing Sheets

SELECTIVELY CONFIGURABLE MISTING APPARATUS

BACKGROUND OF THE INVENTION

1. Field of the Invention

The present invention relates generally to an apparatus for dispersing fluid and, more specifically, to a system and apparatus for encompassing an area with a higher degree of atomized moisture whereby humidity is increased to provide comfort using the existing hydrosphere to supply the fluid. The fluid is preferably water and the apparatus includes means for acquiring water from the hydrosphere. The acquired water is filtered and pumped through dispersal means thereby creating a misting effect. The dispersal means are selectively connectable and configurable to form any desired shape and size.

2. Description of the Prior Art

There are other misting device designed for outdoor use. Typical of these is U.S. Pat. No. 5,330,104 issued to Marcus on Jul. 19, 1994.

Another patent was issued to Nelson on Mar. 25, 1997 as U.S. Pat. No. 5,613,371. Yet another U.S. Pat. No. 5,628,273 was issued to Crouse, II on May 13, 1997 and still yet another was issued on Jan. 18, 2000 to Ducey as U.S. Pat. No. 6,015,099.

Another patent was issued to Edwards on Jul. 4, 2000 as U.S. Pat. No. 6,081,944. Yet another U.S. Pat. No. 6,158,669 was issued to Louis on Dec. 12, 2000. Another was issued to Edwards on Jan. 23, 2001 as U.S. Pat. No. 6,175,969 and still yet another was issued on Jul. 24, 2001 to Key as U.S. Pat. No. 6,236,826.

Another patent was issued to Palestrant on Nov. 13, 2001 as U.S. Pat. No. 6,315,219. Yet another U.S. Pat. No. 6,325,362 was issued to Massey et al. on Dec. 4, 2001. Another was issued to Louis on Dec. 10, 1998 as W.O. Patent No. WO 98/54952 and still yet another was issued on Feb. 22, 2001 to Louis as W.O. Patent No. WO 01/12339.

U.S. Pat. No. 5,330,104

Inventor: David G. Marcus

Issued: Jul. 19, 1994

Disclosed is apparatus for providing a comfortable region within a relatively hot, dry environment having a reservoir of water therein, including a container having a base, sides, and an openable lid; a self-priming pump mounted to the base and having a pump inlet and a pump outlet; an electrical battery having a liquidic electrolyte for powering the pump; a spray wand having a plurality of nozzles spaced along a substantially rigid conduit for distributing the water in the form of a corresponding number of expanding fine spray streams; a fluid conduit for connection to the pump and the nozzles for misting the environment, the container substantially absorbing noise from operation of the pump and protecting against contamination of the environment by leakage of the electrolyte from the battery; and a solar panel located on the lid of the container for recharging the battery.

U.S. Pat. No. 5,613,371

Inventor: Kim L. Nelson

Issued: Mar. 25, 1997

A method and apparatus for misting vehicle occupants. A golf cart or other open-air vehicle is equipped with an apparatus for providing a fine spray of water into the air inside and surrounding the vehicle, resulting in evaporative cooling for the occupants. A pumping system forces water from a water reservoir on-board the vehicle through mister nozzles. The pumping system uses a water filter, pump, and accumulator to achieve a steady spray. In the preferred embodiment, a pressure switch in the golf cart seat turns on the spray when an occupant is sitting in the cart, and stops misting when the occupant is not seated. Alternatively, the misters may be switched to spray continuously or turned off.

U.S. Pat. No. 5,628,273

Inventor: Dale E. Crouse, II

Issued: May 13, 1997

A misting apparatus for a boat comprised of a length of tubing secured to a frame supporting a canopy on a boat. A pick up tube is removably secured to a distal end of the length of tubing. A plurality of sprayers are secured to the length of tubing in a position beneath the canopy. A pump is adapted to receive the length of tubing therethrough. The pump will draw sea water through the pick up tube to be sprayed out of the plurality of sprayers.

U.S. Pat. No. 6,015,099

Inventor: Lawrence E. Ducey

Issued: Jan. 18, 2000

A spray apparatus includes a pump for pressurizing water, a drive unit for driving the pump, a flow regulator for regulating the flow of water pressurized by the pump, and a modular spray assembly. The modular spray assembly includes piping connected to the pump, a plurality of quick coupler units connected to the piping, and water outlets connected to the quick coupler units through which the pressurized water is sprayed, wherein the pressurized sprayed water creates a mist and a wind. The spray apparatus can be assembled in a tent-like structure to provide a rain room, wherein a mist and a wind are generated by the apparatus.

U.S. Pat. No. 6,081,944

Inventor: Hugh A. Edwards

Issued: Jul. 4, 2000

A swimming pool screen enclosure-supported water misting and cooling apparatus, the screen enclosure including tensioned fabric screen panels held between spaced apart elongated upright and overhead rigid frame members. The apparatus includes a plurality of water misting nozzles each of which discharge water under pressure as a very fine mist. A flexible water tubing is operably connectable to each misting nozzle for delivering pressurized water to each misting nozzle, the water tubing being connectable to a pressurized water source. A plurality of retaining clips are each connectable to an overhead frame member to support the misting nozzles and water tubing overhead of the swimming pool and adjacent deck area within the screen enclosure whereby mist discharging from the misting nozzles is distributed downwardly to cool occupants within the screen enclosure without substantially wetting any of the screen enclosure contents.

U.S. Pat. No. 6,158,669

Inventor: R. J. Louis

Issued: Dec. 12, 2000

In one embodiment the present invention provides a portable misting device. The portable misting device has a housing including a fluid compartment to store a fluid to be misted. The housing further includes a fluid dispensing orifice to dispense the fluid outside the housing. The housing further includes a pressure providing device that communicates with the fluid compartment to cause the fluid to flow to the fluid dispensing orifice. The portable misting device also includes a handle, mounted to the housing, to carry the housing.

U.S. Pat. No. 6,175,969

Inventor: Hugh A. Edwards

Issued: Jan. 23, 2001

A boat-supported water misting and cooling apparatus, the boat including tubular framework closely associated with the useful open areas of the boat. The apparatus includes a plurality of water misting nozzles each of which discharge pressurized water as a very fine mist. A flexible water (micro) tubing is operably connectable to each misting nozzle for dispensing pressurized water therefrom, the water tubing also being connectable at the other end thereof to a pressurized water source. Retaining clips are each connectable to a section of tubular framework to support the misting nozzles and water tubing adjacent each open area of the boat whereby mist discharging from the misting nozzles is distributed to cool occupants within each misting zone by evaporation substantially before skin or boat surface contact thus avoiding any substantial water buildup.

U.S. Pat. No. 6,263,826

Inventor: Johnny Key

Issued: Jul. 24, 2001

A fountain canopy is provided having a water intake positioned below the water line of a boat which directs water from a pump through a conduit. A portion of the conduit is threaded through a frame supporting a boat canopy. An outlet of the frame allows a discharge end of the conduit to be connected to a discharge nozzle which generates a coarse spray of water upwardly, the spray cascading downwardly in a rain-like shower around the boat and surrounding vicinity.

U.S. Pat. No. 6,315,219

Inventor: Nathan Palestrant

Issued: Nov. 13, 2001

A fluid-atomization manifold (50) for use in a misting system (20) configured to distribute a fluid (24) and to render that fluid (24) into a mist (26) is provided. The fluid-atomization manifold (50) has an input connector (54) coupled to a connector (44) of an interface fitting (36) coupled to fluid-distribution tubing (34) of the misting system (20). The fluid-atomization manifold (50) has a plurality of output connectors (56), wherein a connector (48) of each of a plurality of fluid-atomization nozzles (46) of the misting system (20) is configured to mate with the connector (44) of the interface fitting (36) and is coupled to one of the output connectors (56) of the fluid-atomization manifold (50). Within the fluid-atomization manifold (50), one of the output connectors (56) has an axis (66) substantially coincident with an axis (64) of the input connector (54) and others of the output connectors (56) have axes (66) symmetrically radially arranged at substantially identical angles (68) relative to the axis (64) of the input connector (54).

U.S. Pat. No. 6,325,362

Inventor: Raymond O. Massey et al.

Issued: Dec. 4, 2001

An apparatus for cooling occupants of an open-air vehicle with a mist of water provided by a spray nozzle and blown by a fan onto the occupants. An apparatus having a water reservoir, pump, heat exchanger, nozzle for atomizing water and fan provides a mist of water through directional vents resulting in enhanced evaporative cooling of the vehicle occupants.

W.O. Patent Number WO 98/54952

Inventor: R. J. Louis

Issued: Dec. 10, 1998

A misting device is provided. The misting device includes at least one nozzle configured to spray a fluid. The misting device also includes a conduit configured to supply the fluid to the at least one nozzle. The conduit has a first end coupled to the at least one nozzle. The conduit has a second end that communicates with a fluid compartment of a base housing included in the misting device. The base housing includes a pressure providing device that communicates with the fluid compartment. The pressure providing device is configured to cause the fluid to flow to the at least one nozzle via the conduit. The base housing further includes a cooling compartment adjacent the fluid compartment. The cooling compartment is configured to cool the fluid.

W.O. Patent Number WO 01/12339

Inventor: R. J. Louis

Issued: Feb. 22, 2001

In one embodiment the present invention provides a portable misting device. The portable misting device has a housing including a fluid compartment to store a fluid to be misted. The housing further includes a fluid dispensing orifice to dispense the fluid outside the housing. The housing further includes a pressure providing device that communicates with the fluid compartment to cause the fluid to flow to the fluid dispensing orifice. The portable misting device also includes a handle mounted to the housing, to carry the housing.

While these misting devices may be suitable for the purposes for which they were designed, they would not be as suitable for the purposes of the present invention, as hereinafter described.

SUMMARY OF THE PRESENT INVENTION

The present invention relates generally to an apparatus for dispersing fluid and, more specifically, to a system and apparatus for encompassing an area with a higher degree of atomized moisture whereby humidity is increased to provide comfort using the existing hydrosphere to supply the fluid. The fluid is preferably water and the apparatus includes means for acquiring water from the hydrosphere. The acquired water is filtered and pumped through dispersal means thereby creating a misting effect. The dispersal means are selectively connectable and configurable to form any desired shape and size.

A primary object of the present invention is to provide a misting apparatus that overcomes the shortcomings of the prior art.

Another, secondary object of the present invention is to provide a misting apparatus that increases atmospheric water vapor in a localized outdoor area.

Another object of the present invention is to provide a misting apparatus having network of nozzles within the localized area that are operatively connected to a pressurized fluid system.

Yet another object of the present invention is to provide a misting apparatus having a pump for delivering pressurized liquid to the plurality of nozzles.

Still yet another object of the present invention is to provide a misting apparatus having a source of liquid to be pumped and dispersed by the plurality of nozzles.

Yet another object of the present invention is to provide a misting apparatus having a portable electrical power source for providing power to the apparatus.

Another object of the present invention is to provide a misting apparatus having an electrical connection including an adapter for connection with at least one of a power outlet and an electrical accessory outlet.

Yet another object of the present invention is to provide a misting apparatus wherein the source of liquid for dispersal is a natural hydrosphere including at least one of a lake, river, ocean or stream.

A further object of the present invention is to provide a misting apparatus including a filter attachment connected to the means for acquiring the fluid for selectively filtering the fluid prior to dispersal thereof.

Still yet another object of the present invention is to provide a misting apparatus having a reservoir for storing liquid therein.

Another object of the present invention is to provide a misting apparatus having connection members for connecting the plurality of nozzles to the pump.

Yet another object of the present invention is to provide a misting apparatus having a flexible conduit and a series of connectors for selectively connecting the connection members to one another.

Still yet another object of the present invention is to provide a misting apparatus including a plurality of fasteners for releasably fastening the connection members to a structure for creation of a localized area in which the fluid is dispersed.

Yet another object of the present invention is to provide a misting apparatus wherein the fasteners including at least one of hook and loop fasteners and a clip.

Still yet another object of the present invention is to provide a misting apparatus for connection to a boat.

Additional objects of the present invention will appear as the description proceeds.

The present invention overcomes the shortcomings of the prior art by providing a water misting and cooling apparatus having flexible tubular units with a plurality of water misting nozzles that are screwed into connectors with each of which discharging pressurized water as a very fine mist. The flexible tubing is operably connectable to each misting nozzle for dispensing pressurized water therefrom a series of connectors. The water tubing is also connectable at its other distal end thereof to a pressurized water source (lake or river). Retaining clips are connectable to a section of tubular framework to support the misting system adjacent to each open area of a boat whereby mist discharging is distributed to cool the occupants within the misting zone by evaporation substantially before reaching the skin or boat surface, thus avoiding any substantial water buildup.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the Figures illustrate the misting apparatus of the present invention. With regard to the reference numerals used, the following numbering is used throughout the various drawing Figures.

10 misting apparatus of the present invention
12 pump
14 input tube
16 filter
18 recess
19 power connector
20 supply tube
24 misting unit
25 fastener
26 connector
27 thread
28 nozzle
29 recess
30 connector tubes
31 lip
32 T-shaped connector
34 boat
36 structure
38 power source
40 fastening means
42 battery attachment
43 wiring
44 accessory attachment

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments. Practitioners skilled in the art will recognize numerous other embodiments as well. For definition of the complete scope of the invention, the reader is directed to appended claims.

Turning now descriptively to the drawings, in which similar reference characters denote similar elements throughout the several views, FIGS. 1 through 9 illustrate a misting apparatus of the present invention indicated generally by the numeral 10.

Figure 1:
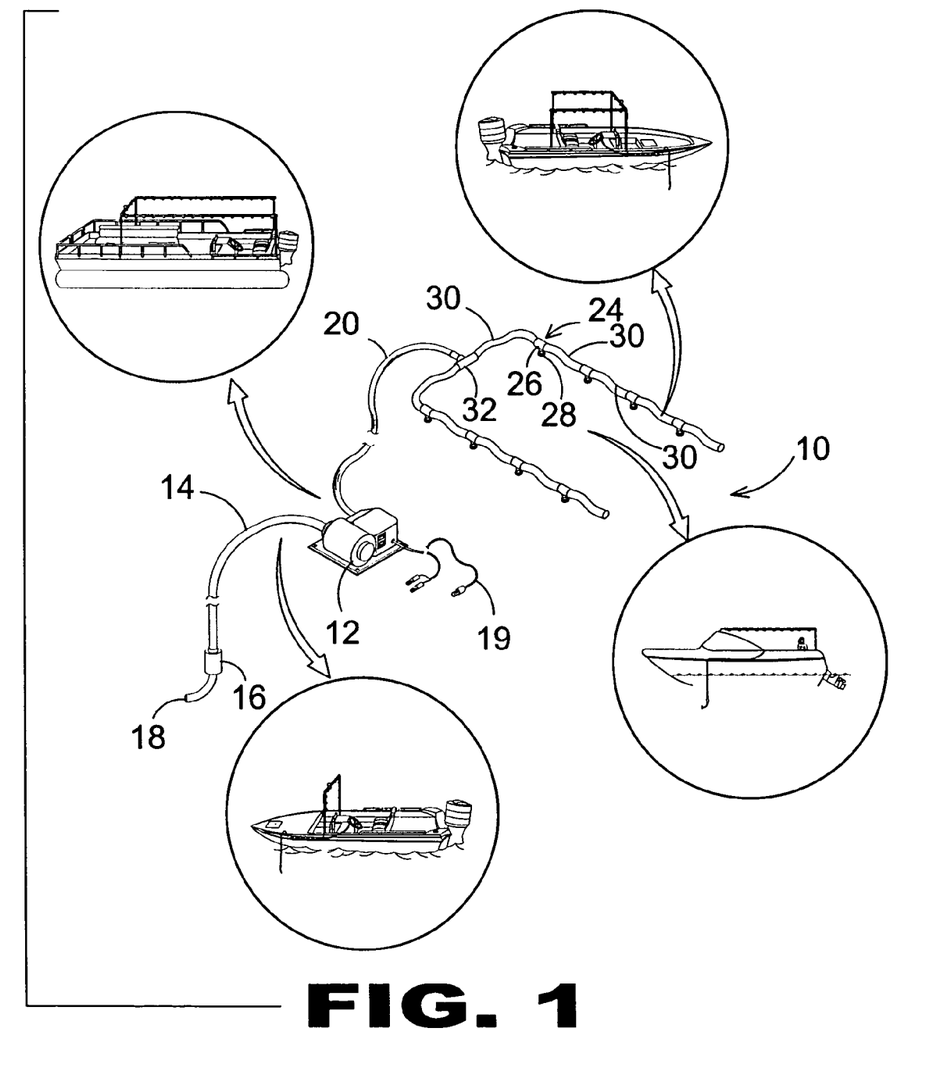
FIG. 1 is an illustrative view of the misting apparatus of the present invention in use.

FIG. 1 is an illustrative view of the misting apparatus 10 of the present invention in use. The misting apparatus 10 includes a pump 12 connected between a first distal end of an input tube 14 and a first distal end of a supply tube 20. The input tube 14 has an opening at the end opposite the first distal end and is positioned in a source of fluid. Preferably the fluid is water from at least one of an ocean, a stream, a river, a lake and a bay. However, the misting apparatus 10 can utilize any fluid to provide mist therefrom. The input tube 14 includes a filter 16 connected in series therewith. The filter 16 filters the water that passes through the input tube 14 to remove any contaminants contained therein. The filter 16 may be any filter known in the art that is able to filter contaminants from any liquid. A supply tube 20 is connected at a second distal end to at least one of a T-shaped connector 32 and a misting unit 24. As shown herein, the supply tube 20 is connected to the t-shaped connector 32 a first opening thereof. At each of the second and third openings of the t-shaped connector 32, misting units 24 are connected thereto. The misting unit 24 includes a tubing 30 releasably connected to a connector body 26. The connector body 26 includes a misting nozzle 28 extending outwardly therefrom. Preferably, additional tubing 30 and misting units 24 are connected to a second end of each respective connector body 26 of each respective misting unit 24. The selective configurability of the misting units 24 to one another allows a user to fashion the misting apparatus 10 of the present invention in any geometric shape. Additionally, a plurality of T-shaped connectors 32 may also be used in forming the geometric shape of the misting apparatus.

Figure 2:
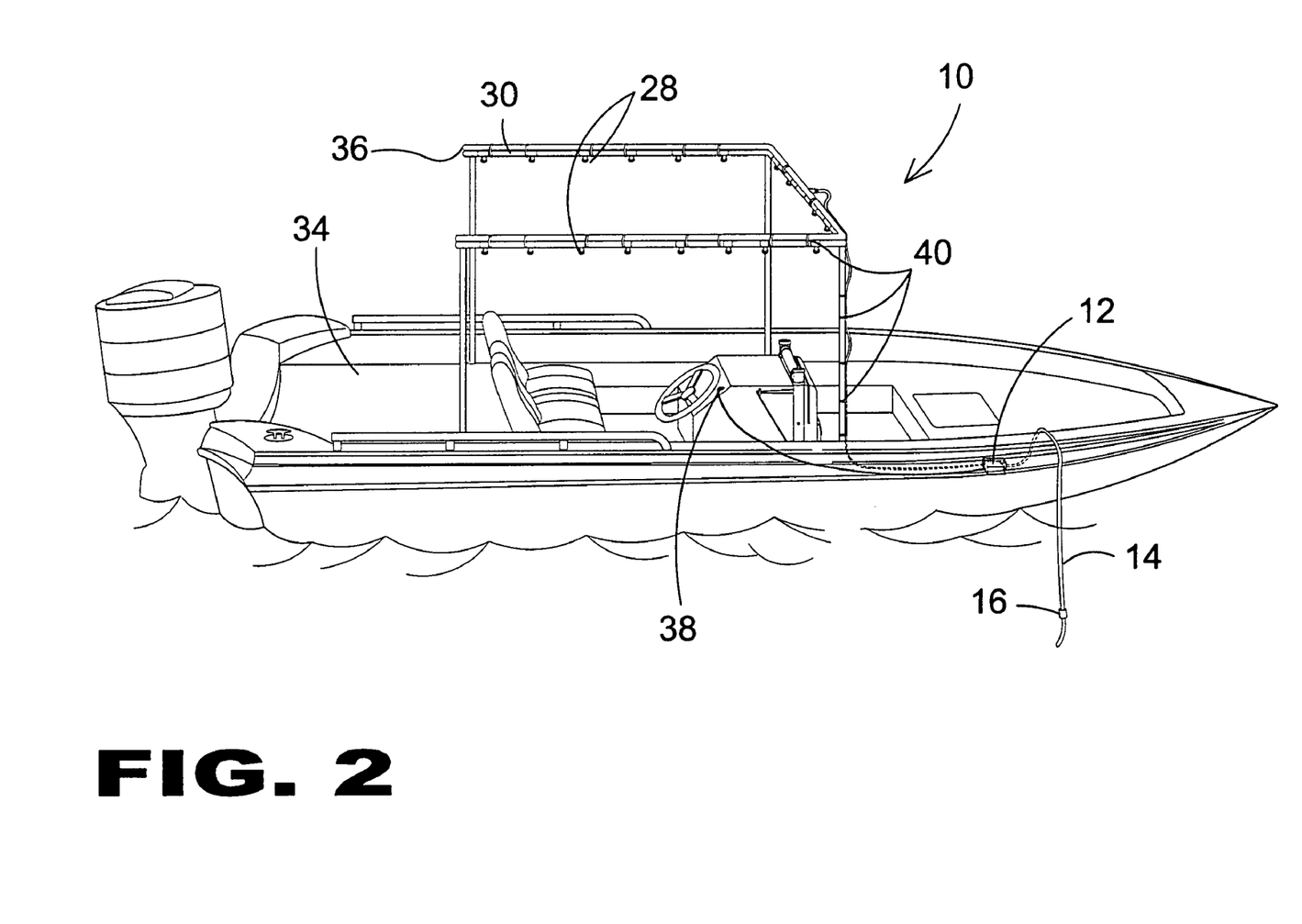
FIG. 2 is an illustrative view of the misting apparatus of the present invention in use.

The misting apparatus 10 of the present invention is powered by a power source 38 as shown in FIG. 2. Power is provided to the pump 12 for obtaining water from the input tube 14 which is immersed in a water source. As the water passes through the input tube 14, the filter 16 filters out any contaminants contained therein. The pump 12 causes the water to be passed through the supply tube 20 and further through the t-shaped connector 32. The water is then provided through the tubing 30 to the misting unit 24. Upon reaching the misting unit 24, the water is directed by the connector body 26 to the misting nozzle 28 wherein a fine mist of water vapor is emitted therefrom. If there are additional misting units 24 connected thereto, the water is further passed through the additional tubing 30 to the additional misting units 24 wherein the water is emitted from the misting nozzle 28. The mist emitted from the misting units 24 provide a cooling apparatus for any users sitting within a localized area within the misting apparatus 10 of the present invention.

As shown in FIG. 1, the misting apparatus 10 of the present invention can be formed in any geometric shape for attachment to a structure to form a canopy over a predetermined area. Preferably, the misting apparatus is used on a boat forming a canopy over the area having seats for each passenger thereby providing each passenger a cooling mist while on the boat. However, this is shown for purpose of example only and the misting apparatus can be used in any area whereby users require a cool mist FIG. 2 is an illustrative view of the misting apparatus of the present invention in use. The misting apparatus 10 includes the pump 12 connected between the first distal end of the input tube 14 and the first distal end of the supply tube 20. The input tube 14 has an opening at the end opposite the first distal end and is positioned in a source of fluid. Preferably the fluid is water from at least one of an ocean, a stream, a river, a lake and a bay. However, the misting apparatus 10 can utilize any fluid to provide mist therefrom. The input tube 14 includes the filter 16 connected in series therewith. The filter 16 filters the water that passes through the input tube 14 to remove any contaminants contained therein. The filter 16 may be any filter known in the art that is able to filter contaminants from any liquid. The supply tube 20 is connected at a second distal end to at least one of the T-shaped connector 32 and the misting unit 24. As shown herein, the supply tube 20 is connected to the t-shaped connector 32 a first opening thereof. At each of the second and third openings of the t-shaped connector 32, misting units 24 are connected thereto. The misting unit 24 includes tubing 30 releasably connected to the connector body 26. The connector body 26 includes the misting nozzle 28 extending outwardly therefrom. Preferably, additional tubing 30 and misting units 24 are connected to the second end of each respective connector body 26 of each respective misting unit 24. The selective configurability of the misting units 24 to one another allows a user to fashion the misting apparatus 10 of the present invention in any geometric shape. Additionally, a plurality of T-shaped connectors 32 may also be used in forming the geometric shape of the misting apparatus.

The misting apparatus 10 of the present invention is powered by a power source 38 as shown in FIG. 2. Power is provided to the pump 12 for obtaining water from the input tube 14 which is immersed in a water source. As the water passes through the input tube 14, the filter 16 filters out any contaminants contained therein. The pump 12 causes the water to be passed through the supply tube 20 and further through the t-shaped connector 32. The water is then provided through the tubing 30 to the misting unit 24. Upon reaching the misting unit 24, the water is directed by the connector body 26 to the misting nozzle 28 wherein a fine mist of water vapor is emitted therefrom. If there are additional misting units 24 connected thereto, the water is further passed through the additional tubing 30 to the additional misting units 24 wherein the water is emitted from the misting nozzle 28. The mist emitted from the misting units 24 provide a cooling apparatus for any users sitting within a localized area within the misting apparatus 10 of the present invention.

As shown herein, the misting apparatus 10 is secured to a structure 36 for forming a canopy thereunder. The structure 36 can is selectively configurable to form any geometric shape while being releasably secured to a boat. The misting units 24 of the apparatus 10 of the present invention are secured to the structure by fasteners 40. The fasteners 40 are at least one of a clip, a tie-wrap, a hook and loop fastener and a buckle. The misting apparatus 10 of the present invention is shown connected to the power source 38. The input tube is hanging over the side of the boat having the first end submerged in the water. The pump 12 causes water to be taken up by the input tube and passed through the filter 16 for filtering thereof. Water is then passed through the supply tube 20 to the t-connector 32 and further to each individual misting unit 24. The misting units 24 the emit a mist from the misting nozzle 28 which selectively cools the users sitting in the area under the canopy created by the structure 36.

The present invention as shown in FIG. 2 is a boat canopy structure having a misting apparatus 10 thereon. The misting apparatus 10 includes flexible tubular units with a plurality of water misting nozzles 28 each of which discharge pressurized water as a very fine mist. The flexible tubing is operably connectable to each misting nozzle by a connector that the misters may be screwed into for dispensing pressurized water therefrom. The water is distributed to cool the occupants within the misting zone by evaporation substantially before reaching the skin or boat surface, thus avoiding any substantial water buildup.

Figure 3:
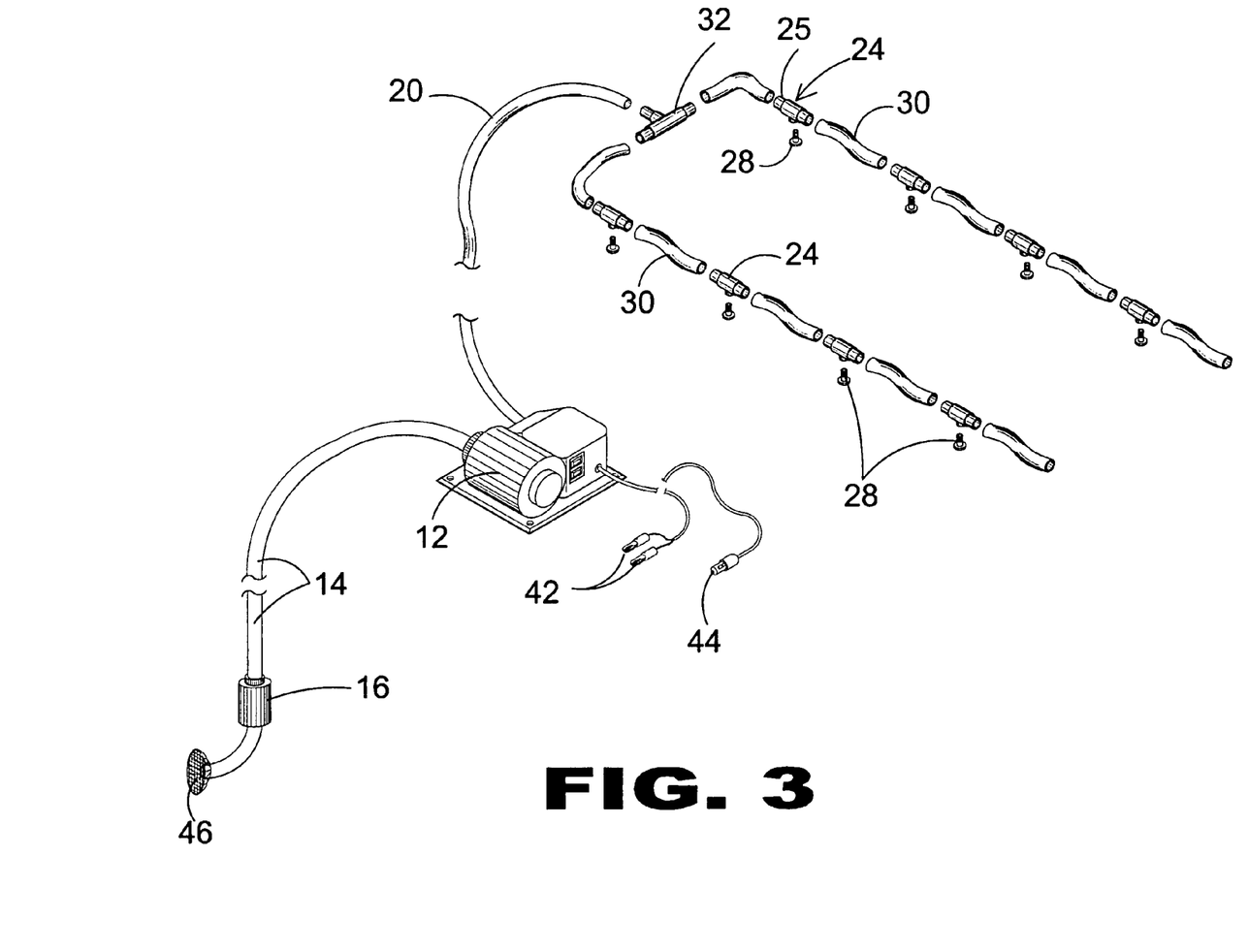
FIG. 3 is a perspective view of the misting apparatus of the present invention.

FIG. 3 is a perspective view of the misting apparatus of the present invention. The misting apparatus 10 includes the pump 12 connected between the first distal end of the input tube 14 and the first distal end of the supply tube 20. The input tube 14 has an opening at the end opposite the first distal end and is positioned in a source of fluid. Preferably the fluid is water from at least one of an ocean, a stream, a river, a lake and a bay. However, the misting apparatus 10 can utilize any fluid to provide mist therefrom. The input tube 14 includes the filter 16 connected in series therewith. The filter 16 filters the water that passes through the input tube 14 to remove any contaminants contained therein. The filter 16 may be any filter known in the art that is able to filter contaminants from any liquid. The supply tube 20 is connected at a second distal end to at least one of the T-shaped connector 32 and the misting unit 24. As shown herein, the supply tube 20 is connected to the t-shaped connector 32 a first opening thereof. At each of the second and third openings of the t-shaped connector 32, misting units 24 are connected thereto. The misting unit 24 includes tubing 30 releasably connected to the connector body 26. The connector body 26 includes the misting nozzle 28 extending outwardly therefrom. Preferably, additional tubing 30 and misting units 24 are connected to the second end of each respective connector body 26 of each respective misting unit 24. The selective configurability of the misting units 24 to one another allows a user to fashion the misting apparatus 10 of the present invention in any geometric shape. Additionally, a plurality of T-shaped connectors 32 may also be used in forming the geometric shape of the misting apparatus.

The misting apparatus 10 of the present invention is powered by a power source 38 as shown in FIG. 2. Power is provided to the pump 12 for obtaining water from the input tube 14 which is immersed in a water source. As the water passes through the input tube 14, the filter 16 filters out any contaminants contained therein. The pump 12 causes the water to be passed through the supply tube 20 and further through the t-shaped connector 32. The water is then provided through the tubing 30 to the misting unit 24. Upon reaching the misting unit 24, the water is directed by the connector body 26 to the misting nozzle 28 wherein a fine mist of water vapor is emitted therefrom. If there are additional misting units 24 connected thereto, the water is further passed through the additional tubing 30 to the additional misting units 24 wherein the water is emitted from the misting nozzle 28. The mist emitted from the misting units 24 provide a cooling apparatus for any users sitting within a localized area within the misting apparatus 10 of the present invention.

Additionally, the misting apparatus 10 of the present invention includes a debris guard 46 that is releasably secured to the opening of the input tube that is submerged in the water source. This prevents any large objects from being sucked into the input tube by the pump 12. The debris guard also aids the filter 16 in filtering contaminants from the water to be dispersed as mist by the nozzle 28.

Power is provided to the pump via at least one of a battery attachment 42 and an accessory plug 44. The battery attachment 42 is preferably a positive and negative clip that can be releasably secured to the positive and negative poles of a battery. The accessory plug 44 is selectively connectable within a power port so as to obtain power from the boat.

Figure 4:
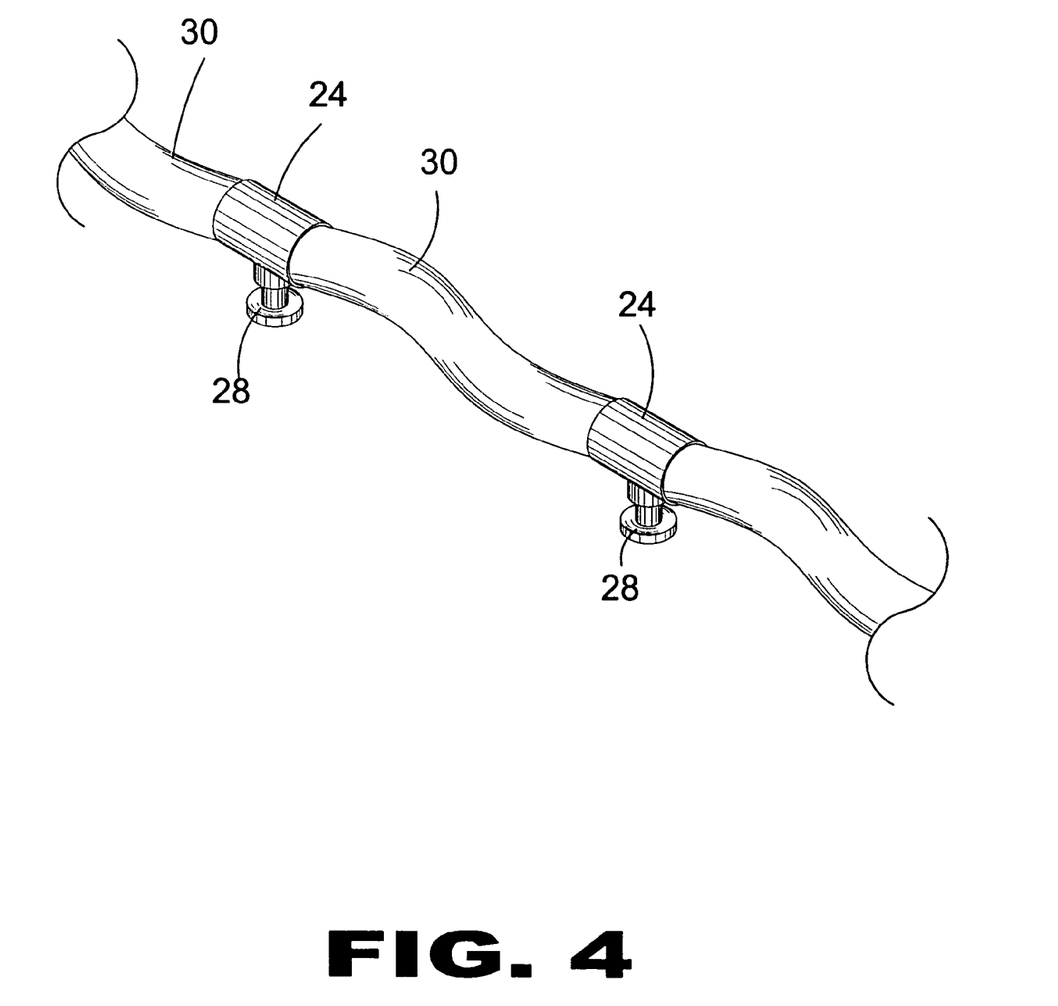
FIG. 4 is a perspective view of a single misting unit of the misting apparatus of the present invention.

FIG. 4 is a perspective view of a single misting unit of the misting apparatus of the present invention. The misting apparatus 10 includes the pump 12 connected between the first distal end of the input tube 14 and the first distal end of the supply tube 20. The input tube 14 has an opening at the end opposite the first distal end and is positioned in a source of fluid. Preferably the fluid is water from at least one of an ocean, a stream, a river, a lake and a bay. However, the misting apparatus 10 can utilize any fluid to provide mist therefrom. The input tube 14 includes the filter 16 connected in series therewith. The filter 16 filters the water that passes through the input tube 14 to remove any contaminants contained therein. The filter 16 may be any filter known in the art that is able to filter contaminants from any liquid. The supply tube 20 is connected at a second distal end to at least one of the T-shaped connector 32 and the misting unit 24. As shown herein, the supply tube 20 is connected to the t-shaped connector 32 a first opening thereof. At each of the second and third openings of the t-shaped connector 32, misting units 24 are connected thereto. The misting unit 24 includes tubing 30 releasably connected to the connector body 26. The connector body 26 includes the misting nozzle 28 extending outwardly therefrom. Preferably, additional tubing 30 and misting units 24 are connected to the second end of each respective connector body 26 of each respective misting unit 24. The selective configurability of the misting units 24 to one another allows a user to fashion the misting apparatus 10 of the present invention in any geometric shape. Additionally, a plurality of T-shaped connectors 32 may also be used in forming the geometric shape of the misting apparatus.

The misting apparatus 10 of the present invention is powered by a power source 38 as shown in FIG. 2. Power is provided to the pump 12 for obtaining water from the input tube 14 which is immersed in a water source. As the water passes through the input tube 14, the filter 16 filters out any contaminants contained therein. The pump 12 causes the water to be passed through the supply tube 20 and further through the t-shaped connector 32. The water is then provided through the tubing 30 to the misting unit 24. Upon reaching the misting unit 24, the water is directed by the connector body 26 to the misting nozzle 28 wherein a fine mist of water vapor is emitted therefrom. If there are additional misting units 24 connected thereto, the water is further passed through the additional tubing 30 to the additional misting units 24 wherein the water is emitted from the misting nozzle 28. The mist emitted from the misting units 24 provide a cooling apparatus for any users sitting within a localized area within the misting apparatus 10 of the present invention.

Figure 5:
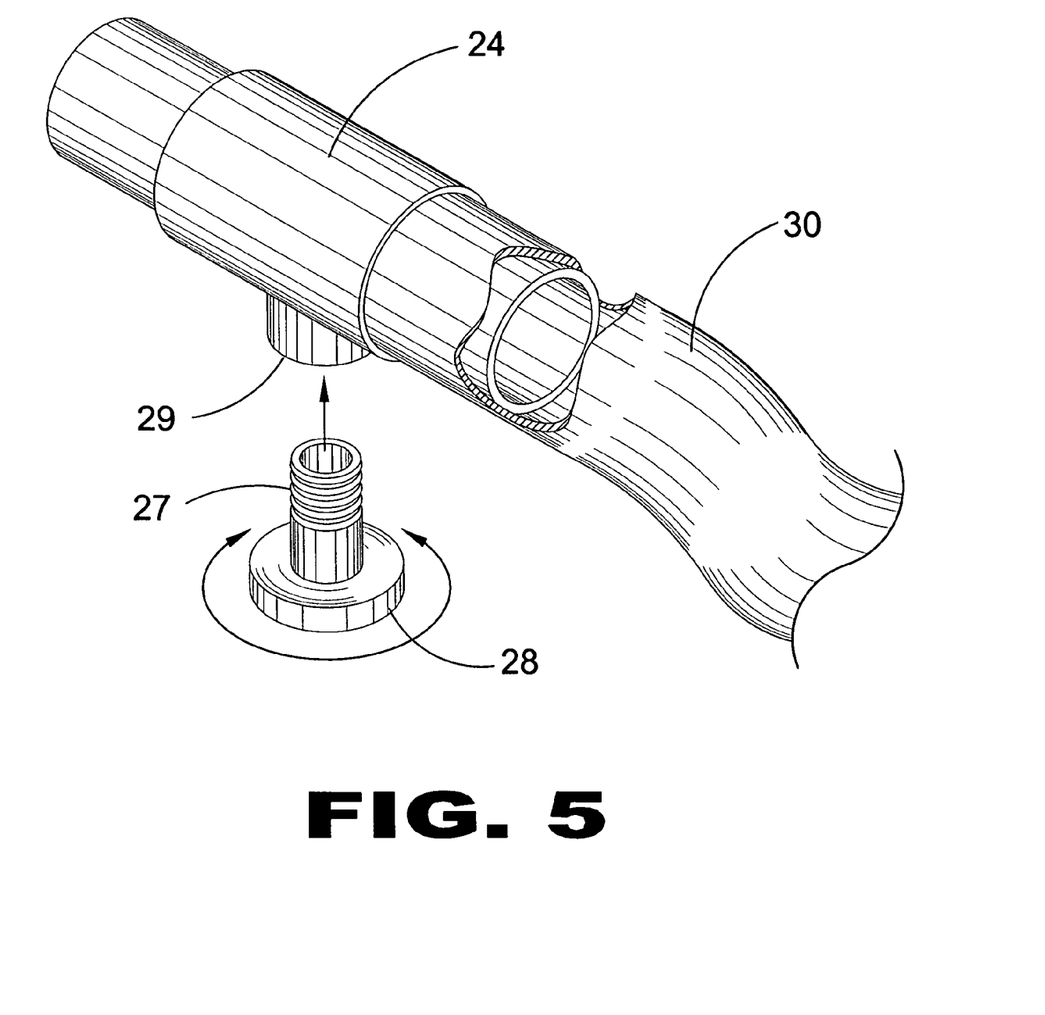
FIG. 5 is a partial cut away perspective view of the misting apparatus of the present invention.

FIG. 5 is a partial cut away perspective view of the misting apparatus of the present invention. The misting apparatus 10 includes the pump 12 connected between the first distal end of the input tube 14 and the first distal end of the supply tube 20. The input tube 14 has an opening at the end opposite the first distal end and is positioned in a source of fluid. Preferably the fluid is water from at least one of an ocean, a stream, a river, a lake and a bay. However, the misting apparatus 10 can utilize any fluid to provide mist therefrom. The input tube 14 includes the filter 16 connected in series therewith. The filter 16 filters the water that passes through the input tube 14 to remove any contaminants contained therein. The filter 16 may be any filter known in the art that is able to filter contaminants from any liquid. The supply tube 20 is connected at a second distal end to at least one of the T-shaped connector 32 and the misting unit 24. As shown herein, the supply tube 20 is connected to the t-shaped connector 32 a first opening thereof. At each of the second and third openings of the t-shaped connector 32, misting units 24 are connected thereto. The misting unit 24 includes tubing 30 releasably connected to the connector body 26. The connector body 26 includes the misting nozzle 28 extending outwardly therefrom. Preferably, additional tubing 30 and misting units 24 are connected to the second end of each respective connector body 26 of each respective misting unit 24. The selective configurability of the misting units 24 to one another allows a user to fashion the misting apparatus 10 of the present invention in any geometric shape. Additionally, a plurality of T-shaped connectors 32 may also be used in forming the geometric shape of the misting apparatus.

The misting apparatus 10 of the present invention is powered by a power source 38 as shown in FIG. 2. Power is provided to the pump 12 for obtaining water from the input tube 14 which is immersed in a water source. As the water passes through the input tube 14, the filter 16 filters out any contaminants contained therein. The pump 12 causes the water to be passed through the supply tube 20 and further through the t-shaped connector 32. The water is then provided through the tubing 30 to the misting unit 24. Upon reaching the misting unit 24, the water is directed by the connector body 26 to the misting nozzle 28 wherein a fine mist of water vapor is emitted therefrom. If there are additional misting units 24 connected thereto, the water is further passed through the additional tubing 30 to the additional misting units 24 wherein the water is emitted from the misting nozzle 28. The mist emitted from the misting units 24 provide a cooling apparatus for any users sitting within a localized area within the misting apparatus 10 of the present invention.

FIG. 5 shows the manner in which the misting nozzle 28 is selectively connected to the connector body 26 of the misting unit 24. The misting nozzle 28 includes a thread 27 which is selectively rotatable within a recess 29 of the connector body 26. The misting nozzle 28 is rotated in the direction indicated by the arrow shown in FIG. 5. This facilitates cleaning of both the nozzle 28 and connector body 26.

Figure 6:
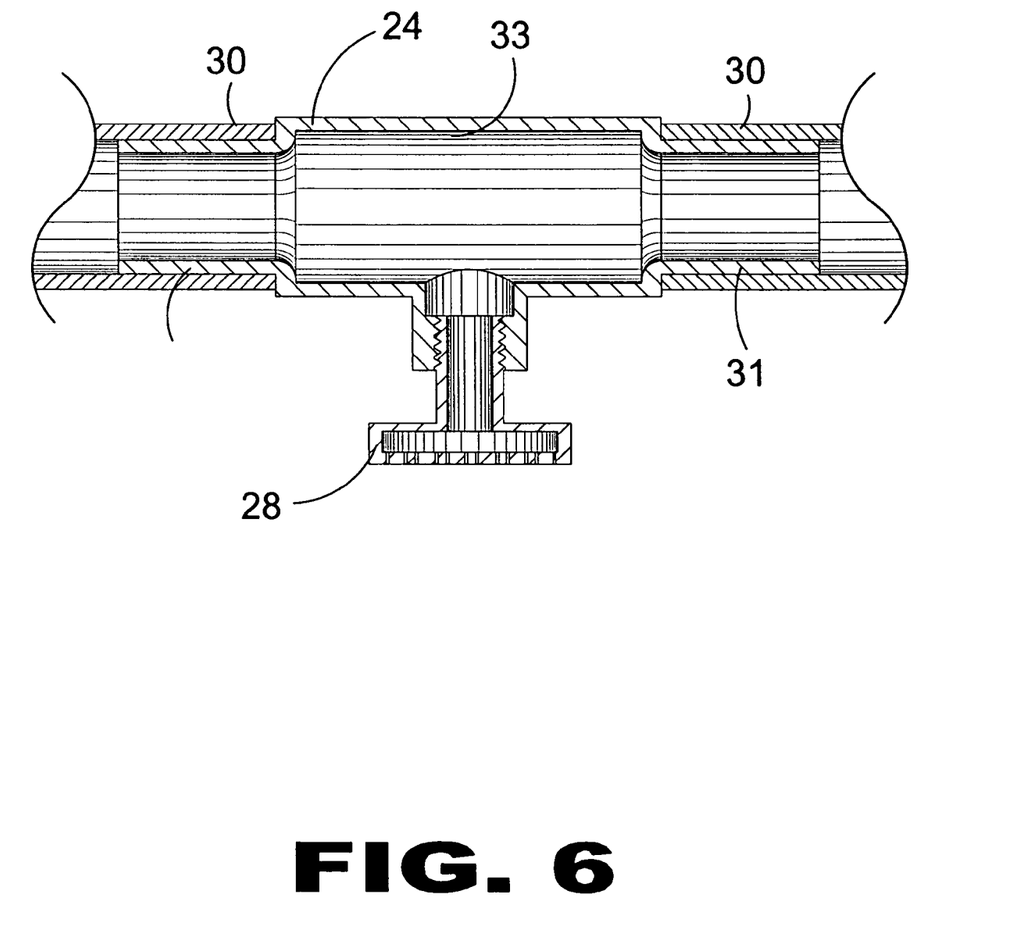
FIG. 6 is a cross-sectional view of a single misting unit of the misting apparatus of the present invention.

FIG. 6 is a cross-sectional view of a single misting unit of the misting apparatus of the present invention. The misting apparatus 10 includes the pump 12 connected between the first distal end of the input tube 14 and the first distal end of the supply tube 20. The input tube 14 has an opening at the end opposite the first distal end and is positioned in a source of fluid. Preferably the fluid is water from at least one of an ocean, a stream, a river, a lake and a bay. However, the misting apparatus 10 can utilize any fluid to provide mist therefrom. The input tube 14 includes the filter 16 connected in series therewith. The filter 16 filters the water that passes through the input tube 14 to remove any contaminants contained therein. The filter 16 may be any filter known in the art that is able to filter contaminants from any liquid. The supply tube 20 is connected at a second distal end to at least one of the T-shaped connector 32 and the misting unit 24. As shown herein, the supply tube 20 is connected to the t-shaped connector 32 a first opening thereof. At each of the second and third openings of the t-shaped connector 32, misting units 24 are connected thereto. The misting unit 24 includes tubing 30 releasably connected to the connector body 26. The connector body 26 includes the misting nozzle 28 extending outwardly therefrom. Preferably, additional tubing 30 and misting units 24 are connected to the second end of each respective connector body 26 of each respective misting unit 24. The selective configurability of the misting units 24 to one another allows a user to fashion the misting apparatus 10 of the present invention in any geometric shape. Additionally, a plurality of T-shaped connectors 32 may also be used in forming the geometric shape of the misting apparatus.

The misting apparatus 10 of the present invention is powered by a power source 38 as shown in FIG. 2. Power is provided to the pump 12 for obtaining water from the input tube 14 which is immersed in a water source. As the water passes through the input tube 14, the filter 16 filters out any contaminants contained therein. The pump 12 causes the water to be passed through the supply tube 20 and further through the t-shaped connector 32. The water is then provided through the tubing 30 to the misting unit 24. Upon reaching the misting unit 24, the water is directed by the connector body 26 to the misting nozzle 28 wherein a fine mist of water vapor is emitted therefrom. If there are additional misting units 24 connected thereto, the water is further passed through the additional tubing 30 to the additional misting units 24 wherein the water is emitted from the misting nozzle 28. The mist emitted from the misting units 24 provide a cooling apparatus for any users sitting within a localized area within the misting apparatus 10 of the present invention.

Shown herein is a sectional view of a misting unit 24 of the present invention connected. The misting nozzle 28 is connected by means of pressure fitting made between a connectors male end to an open female tube end 29 of the connector body 26. Also shown is the manner in which the tubing 30 is connected to each end of the connector body 26. At each distal end of the connector body 26 are lips 31. The lip 31 has a diameter that is smaller than the diameter of a main body 33 of the connector body 26. The tubing 30 is pressure fit over the lip 31. This allows for a plurality of misting units 24 to be connected to on another to form an area in which mist is dispersed thereby cooling any users positioned thereunder.

Figure 7:
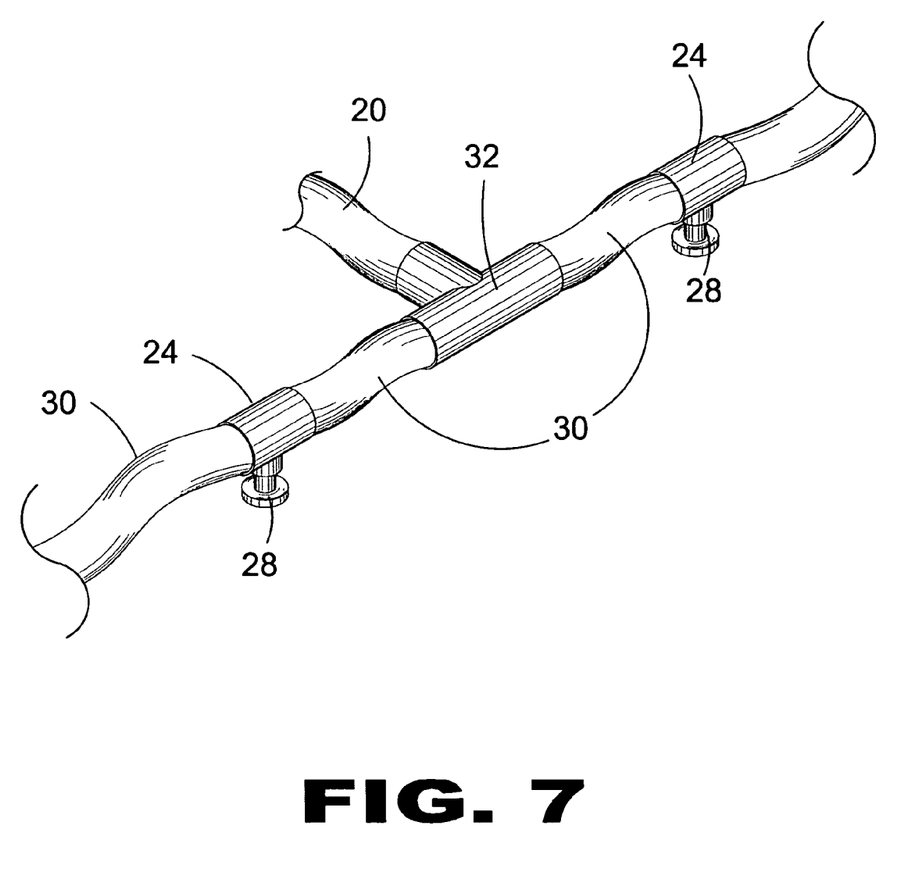
FIG. 7 is a perspective view of a plurality of misting units of the misting apparatus of the present invention.

FIG. 7 is a perspective view of a plurality of misting units of the misting apparatus of the present invention. The misting apparatus 10 includes the pump 12 connected between the first distal end of the input tube 14 and the first distal end of the supply tube 20. The input tube 14 has an opening at the end opposite the first distal end and is positioned in a source of fluid. Preferably the fluid is water from at least one of an ocean, a stream, a river, a lake and a bay. However, the misting apparatus 10 can utilize any fluid to provide mist therefrom. The input tube 14 includes the filter 16 connected in series therewith. The filter 16 filters the water that passes through the input tube 14 to remove any contaminants contained therein. The filter 16 may be any filter known in the art that is able to filter contaminants from any liquid. The supply tube 20 is connected at a second distal end to at least one of the T-shaped connector 32 and the misting unit 24. As shown herein, the supply tube 20 is connected to the t-shaped connector 32 a first opening thereof. At each of the second and third openings of the t-shaped connector 32, misting units 24 are connected thereto. The misting unit 24 includes tubing 30 releasably connected to the connector body 26. The connector body 26 includes the misting nozzle 28 extending outwardly therefrom. Preferably, additional tubing 30 and misting units 24 are connected to the second end of each respective connector body 26 of each respective misting unit 24. The selective configurability of the misting units 24 to one another allows a user to fashion the misting apparatus 10 of the present invention in any geometric shape. Additionally, a plurality of T-shaped connectors 32 may also be used in forming the geometric shape of the misting apparatus.

The misting apparatus 10 of the present invention is powered by a power source 38 as shown in FIG. 2. Power is provided to the pump 12 for obtaining water from the input tube 14 which is immersed in a water source. As the water passes through the input tube 14, the filter 16 filters out any contaminants contained therein. The pump 12 causes the water to be passed through the supply tube 20 and further through the t-shaped connector 32. The water is then provided through the tubing 30 to the misting unit 24. Upon reaching the misting unit 24, the water is directed by the connector body 26 to the misting nozzle 28 wherein a fine mist of water vapor is emitted therefrom. If there are additional misting units 24 connected thereto, the water is further passed through the additional tubing 30 to the additional misting units 24 wherein the water is emitted from the misting nozzle 28. The mist emitted from the misting units 24 provide a cooling apparatus for any users sitting within a localized area within the misting apparatus 10 of the present invention.

Figure 8:
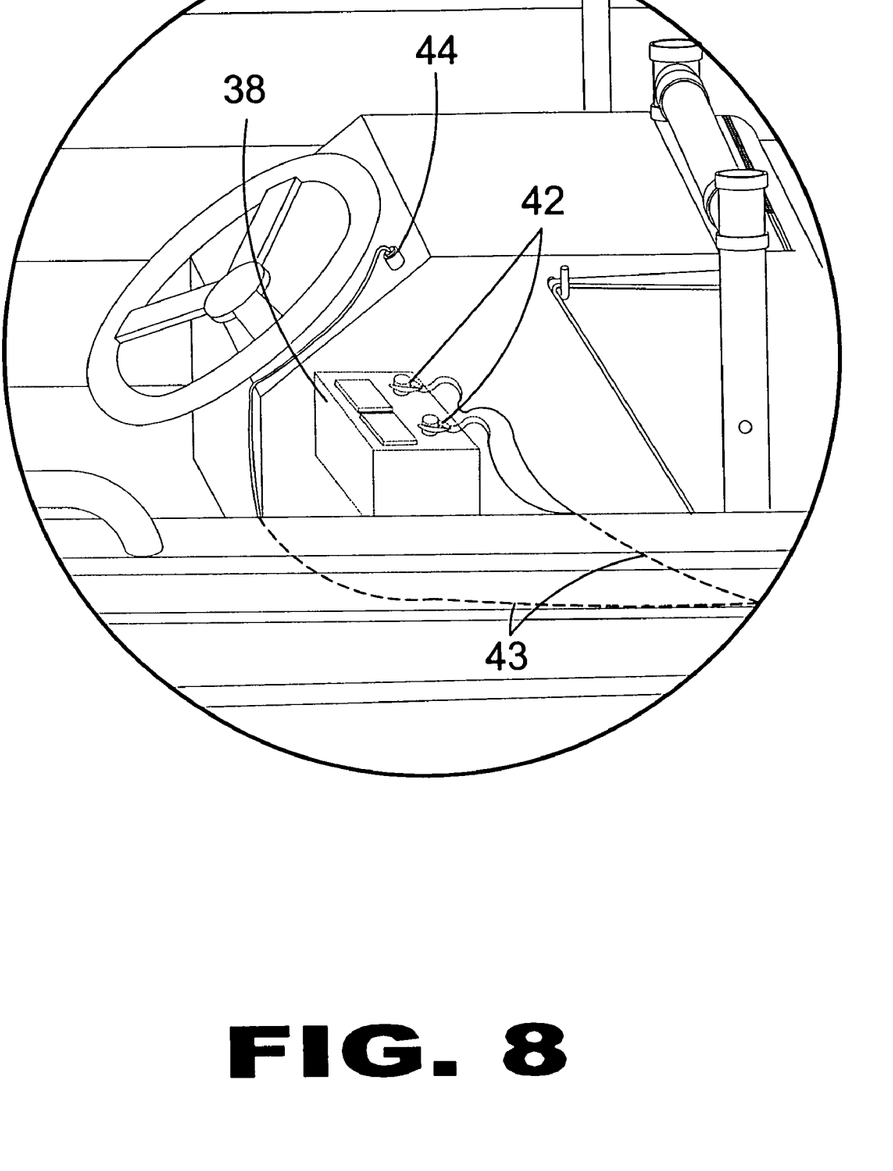
FIG. 8 is an illustrative view of the power connection of the misting apparatus of the present invention.

FIG. 8 is an illustrative view of the power connection of the misting apparatus of the present invention. The misting apparatus 10 includes the pump 12 connected between the first distal end of the input tube 14 and the first distal end of the supply tube 20. The input tube 14 has an opening at the end opposite the first distal end and is positioned in a source of fluid. Preferably the fluid is water from at least one of an ocean, a stream, a river, a lake and a bay. However, the misting apparatus 10 can utilize any fluid to provide mist therefrom. The input tube 14 includes the filter 16 connected in series therewith. The filter 16 filters the water that passes through the input tube 14 to remove any contaminants contained therein. The filter 16 may be any filter known in the art that is able to filter contaminants from any liquid. The supply tube 20 is connected at a second distal end to at least one of the T-shaped connector 32 and the misting unit 24. As shown herein, the supply tube 20 is connected to the t-shaped connector 32 a first opening thereof. At each of the second and third openings of the t-shaped connector 32, misting units 24 are connected thereto. The misting unit 24 includes tubing 30 releasably connected to the connector body 26. The connector body 26 includes the misting nozzle 28 extending outwardly therefrom. Preferably, additional tubing 30 and misting units 24 are connected to the second end of each respective connector body 26 of each respective misting unit 24. The selective configurability of the misting units 24 to one another allows a user to fashion the misting apparatus 10 of the present invention in any geometric shape. Additionally, a plurality of T-shaped connectors 32 may also be used in forming the geometric shape of the misting apparatus.

The misting apparatus 10 of the present invention is powered by a power source 38 as shown in FIG. 2. Power is provided to the pump 12 for obtaining water from the input tube 14 which is immersed in a water source. As the water passes through the input tube 14, the filter 16 filters out any contaminants contained therein. The pump 12 causes the water to be passed through the supply tube 20 and further through the t-shaped connector 32. The water is then provided through the tubing 30 to the misting unit 24. Upon reaching the misting unit 24, the water is directed by the connector body 26 to the misting nozzle 28 wherein a fine mist of water vapor is emitted therefrom. If there are additional misting units 24 connected thereto, the water is further passed through the additional tubing 30 to the additional misting units 24 wherein the water is emitted from the misting nozzle 28. The mist emitted from the misting units 24 provide a cooling apparatus for any users sitting within a localized area within the misting apparatus 10 of the present invention.

Power is provided to the pump via at least one of a battery attachment 42 and an accessory plug 44. The battery attachment 42 is preferably a positive and negative clip that can be releasably secured to the positive and negative poles of a battery. The accessory plug 44 is selectively connectable within a power port so as to obtain power from the boat. Each of the battery adapter 42 and the accessory adapter 44 is connected to the pump via wires 43. It is important to note that only a single adapter is required to provide power to the pump 12 of the present invention. However, both adapters 42,44 can be selectively connected to different power sources thereby providing a fail-safe backup to ensure that the misting apparatus 10 of the present invention continually disperse mist from each nozzle 28.

Figure 9:
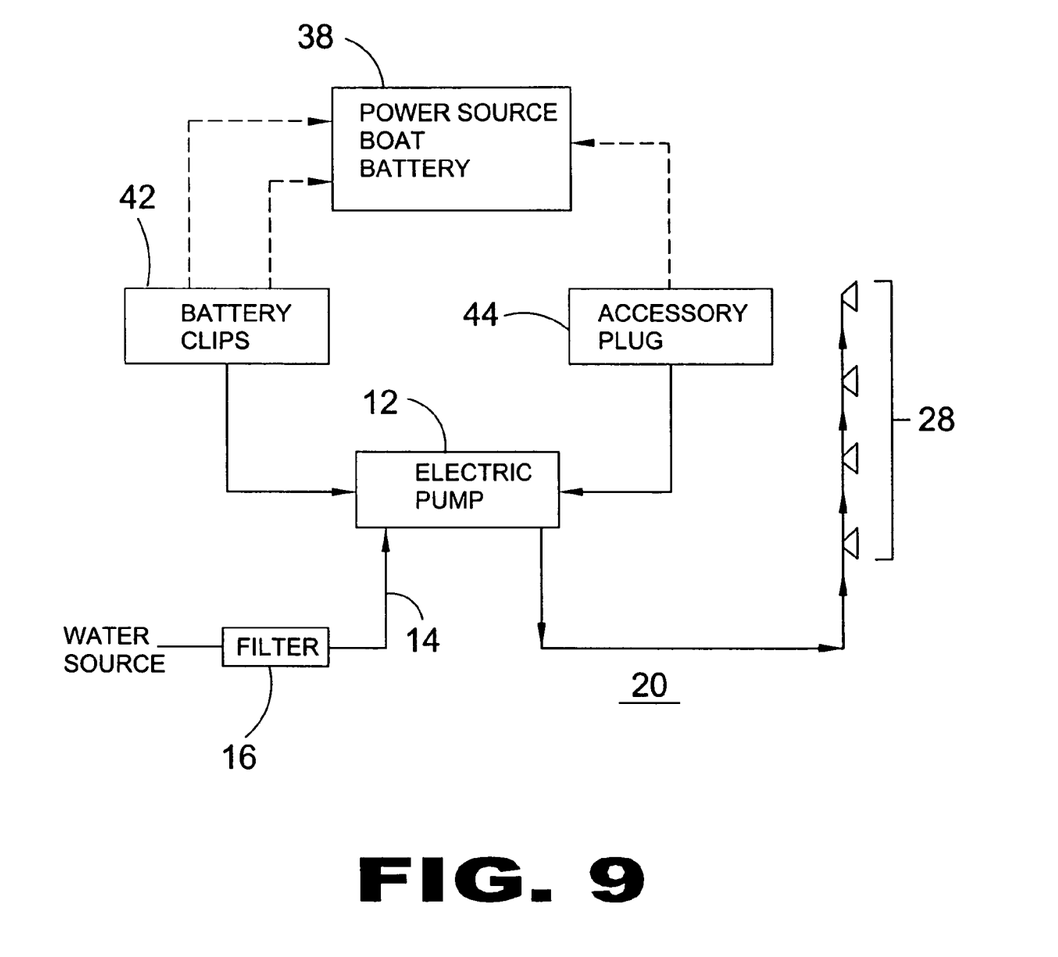
FIG. 9 is a block diagram of the misting apparatus of the present invention.

FIG. 9 is a block diagram of the misting apparatus of the present invention. The misting apparatus 10 includes the pump 12 connected between the first distal end of the input tube 14 and the first distal end of the supply tube 20. The input tube 14 has an opening at the end opposite the first distal end and is positioned in a source of fluid. Preferably the fluid is water from at least one of an ocean, a stream, a river, a lake and a bay. However, the misting apparatus 10 can utilize any fluid to provide mist therefrom. The input tube 14 includes the filter 16 connected in series therewith. The filter 16 filters the water that passes through the input tube 14 to remove any contaminants contained therein. The filter 16 may be any filter known in the art that is able to filter contaminants from any liquid. The supply tube 20 is connected at a second distal end to at least one of the T-shaped connector 32 and the misting unit 24. As shown herein, the supply tube 20 is connected to the t-shaped connector 32 a first opening thereof. At each of the second and third openings of the t-shaped connector 32, misting units 24 are connected thereto. The misting unit 24 includes tubing 30 releasably connected to the connector body 26. The connector body 26 includes the misting nozzle 28 extending outwardly therefrom. Preferably, additional tubing 30 and misting units 24 are connected to the second end of each respective connector body 26 of each respective misting unit 24. The selective configurability of the misting units 24 to one another allows a user to fashion the misting apparatus 10 of the present invention in any geometric shape. Additionally, a plurality of T-shaped connectors 32 may also be used in forming the geometric shape of the misting apparatus.

The misting apparatus 10 of the present invention is powered by a power source 38 as shown in FIG. 2. Power is provided to the pump 12 for obtaining water from the input tube 14 which is immersed in a water source. As the water passes through the input tube 14, the filter 16 filters out any contaminants contained therein. The pump 12 causes the water to be passed through the supply tube 20 and further through the t-shaped connector 32. The water is then provided through the tubing 30 to the misting unit 24. Upon reaching the misting unit 24, the water is directed by the connector body 26 to the misting nozzle 28 wherein a fine mist of water vapor is emitted therefrom. If there are additional misting units 24 connected thereto, the water is further passed through the additional tubing 30 to the additional misting units 24 wherein the water is emitted from the misting nozzle 28. The mist emitted from the misting units 24 provide a cooling apparatus for any users sitting within a localized area within the misting apparatus 10 of the present invention.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An apparatus for dispersing mist in a predetermined area comprising:
   a) means for obtaining water from a water source;
   b) means for dispersing the water as mist comprising a plurality of misting units in series joined by connection tubes and arranged in a U-shaped configuration in a horizontal plane, said U-shaped configuration being arranged over an open cockpit of a boat to provide a cooling mist to occupants of said boat, said boat having uprights and horizontal supporting members for supporting said U-shaped configuration, said water source being a body of water in which boat is floating;
   c) means for connecting said obtaining means to said dispersing means comprising a pump for pumping water from the water source and providing the water to said dispersing means, an input tube connected at a first end to said pump, wherein a second end of said input tube is submerged in said water source, a guard releaseably connected at said second end of said input tube for preventing debris from entering, said input tube having a filter for filtering contaminants from said water passing therethrough, said pump delivering water to a closed end of said U-shaped configuration through a T-shaped connector for providing said water to said misting units;
   d) each misting unit comprising a tube having an outlet on a side of said tube, said outlet having female threads, and a nozzle threaded into said outlet for discharging the mist;
   e) said connecting tubes having lips which extend over opposite ends of adjacent misting units;
   f) said connecting tubes, misting units, and T-shaped connector all releasably connected to each other; and
   g) wherein said connecting tubes are all S-shaped.

2. The apparatus as recited in claim 1, further comprising a plurality of fasteners for releasably fastening said apparatus to said uprights and horizontal supporting members.

3. The apparatus as recited in claim 2, wherein said plurality of fasteners is at least one of a clip, hook and loop fasteners, a buckle and a tie-wrap.

* * * * *